May 7, 1974  R. F. J. COTTERELL  3,809,735
METHOD OF MOULDING HEAT-EXPANDABLE THERMOPLASTIC POLYMERIC
RESINOUS GRANULES INVOLVING ENHANCED DISTRIBUTION OF THE
HOT GASEOUS MEDIUM IN THE MOLD CAVITY
Filed Nov. 15, 1971  2 Sheets-Sheet 1

INVENTOR
Robert Frederick Joseph Cotterell
BY *Ira Milton Jones*
ATTORNEY

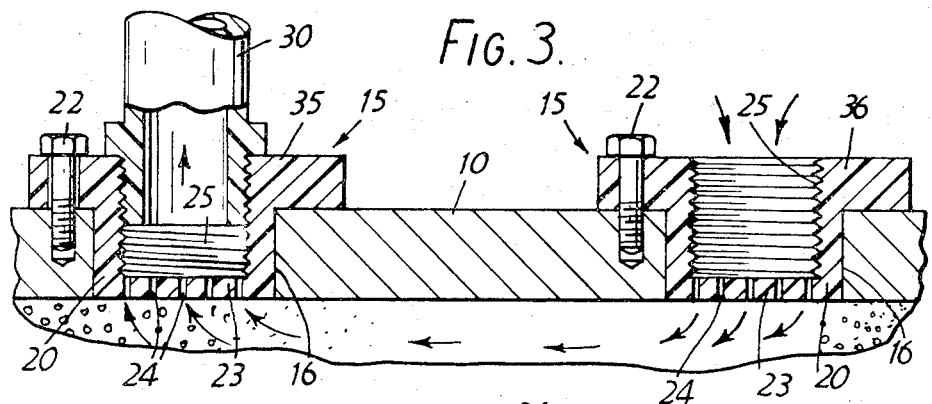
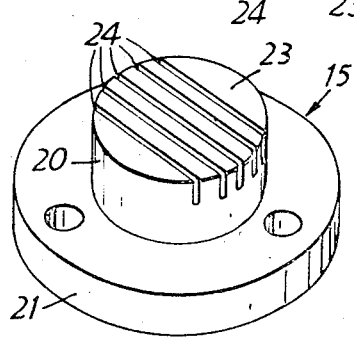
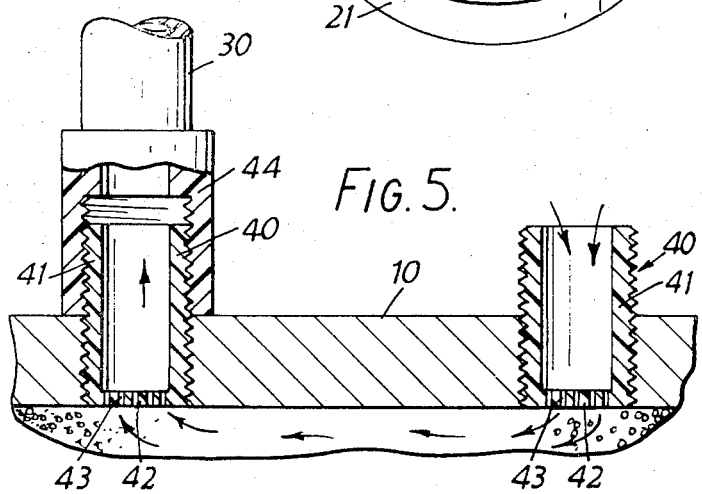
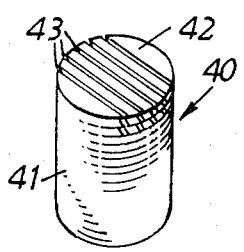

United States Patent Office 3,809,735
Patented May 7, 1974

---

3,809,735
METHOD OF MOULDING HEAT-EXPANDABLE THERMOPLASTIC POLYMERIC RESINOUS GRANULES INVOLVING ENHANCED DISTRIBUTION OF THE HOT GASEOUS MEDIUM IN THE MOLD CAVITY
Robert Frederick Joseph Cotterell, Caplan House, Barchester St., London E.14, England
Continuation-in-part of abandoned application Ser. No. 860,760, Sept. 24, 1969. This application Nov. 15, 1971, Ser. No. 198,766
Int. Cl. B29d 27/00, 27/08
U.S. Cl. 264—51   10 Claims

ABSTRACT OF THE DISCLOSURE

Heat-expandable beads of thermo-plastic material such as polystyrene are moulded by steam heating in a metal mould and venting the interior of the mould through apertures in plugs set into ports in the wall of the mould. The plugs are made of low heat conductivity material, for example nylon, to prevent the apertures being blocked by fusion of the beads in contact with the plugs due to heat condition from the wall of the mould. The steam may be introduced into the mould through apertures in nylon plugs set in ports in the wall of the mould, the low heat conductivity of the nylon preventing the steam raising the plugs to a temperature at which the beads would burn onto the plugs. The same plugs may be used to introduce steam into the mould and then vent the interior of the mould.

---

Figure 1:
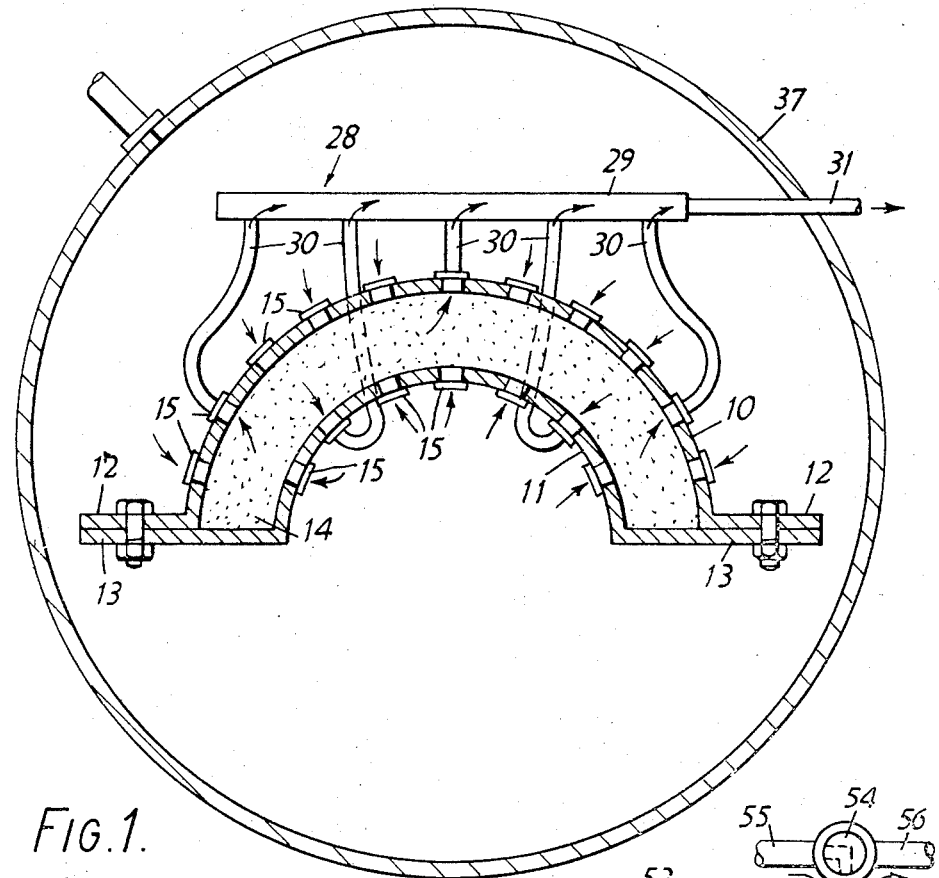

This application is a continuation-in-part of my copending application, Ser. No. 860,760, filed Sept. 24, 1969, and now abandoned.

This invention relates to the moulding of heat-expandable thermoplastic material, for example expandable polystyrene.

Expandable polystyrene is produced by incorporating pentane or other volatile hydrocarbon blowing agent into beads of polystyrene. When such beads are heated, the pressure of the blowing agent confined within the beads is increased and the polystyrene softens, so that the beads expand. The degree of expansion and therefore the density is governed by the temperature and duration of heating. The expandable beads of polystyrene are moulded by first pre-expanding the beads to the required density of the finished article, completely filling a mould with the beads, closing the mould, and then heating the beads within the mould. The heat increases the pressure of the gases within the beads and softens the material so that the beads expand to fill the voids between them and fuse together to form a cellular structure. The mould can conveniently be heated by placing it in an autoclave and then introducing steam into the autoclave, the wall of the mould having apertures for the passage of steam from the autoclave into the interior of the mould. Special automatic opening and closing moulding machines are generally provided for large scale manufacture, the formers of the mould being mounted on jaws which incorporate steam chests, each former serving as one wall of a steam chest and having apertures for passage of steam from the steam chest into the mould when closed.

The moulds at present in general use with expandable thermoplastic material are made of aluminium alloy, since this metal is excellent for casting into shapes and has good thermal conductivity. Steam heating of such moulds has however the disadvantage that it tends to produce articles which have a fused outer crust and a center of unfused beads, and such articles have poor structural properties. This is particularly the case with articles which have a relatively thick section, for example three inches or more thick. It is believed that the steam in contact with the outside surface of the walls of the mould heats up the walls which in turn heat the beads in the peripheral areas of the mould, and the expansion and fusion of the beads in the peripheral areas forms a barrier which prevents further entry of steam through the apertures in the mould walls and also traps air, gas and condensate in the central areas of the mould.

One object of the invention is to provide an improved method of moulding articles of relatively thick section in heat-expandable beads of thermoplastic material in moulds having metal walls in which the beads at the center of the mould become fused.

A further object of the invention is to provide an improved method of moulding thermoplastic material in which air, gas and condensate in the mould are free to escape from the mould until after the beads in the central areas of the mould have been fused.

These objects are achieved in accordance with the invention by venting the interior of the mould through apertures in plugs set into the wall of the mould to form part of the internal surface of the mould, the plugs being made of a material having a coefficient of thermal conductivity substantially lower than that of the metal wall of the mould to ensure that the beads in contact with the plugs are not fused due to heat conduction through the plugs prior to fusion of the beads in the centre of the mould, during the moulding operation.

The plugs can conveniently be made of plastics material capable of withstanding the pressure and temperature existing in the mould during the moulding operation, the maximum values of which will normally not exceed 20 lbs. per square inch and 120° centigrade, and which has a thermal conductivity substantially less than that of the metal wall of the mould. The thermal conductivity of many suitable plastics material, for example nylon and polytetrafluoroethylene, have a co-efficient of thermal conductivity within the range $2-8 \times 10^{-4}$ cal./sec. sq. cm./ 1(° C./cm.) as measured by the C177 ASTM Test Method (see Modern Plastics Encyclopedia volume 47/No. 10A 1970–1971). This range of coefficients of thermal conductivity is very small compared to that for Aluminum which is approximately $4920 \times 10^{-4}$ cal./sec./sq. cm./1 ° C./cm.).

In the method of the invention the apertures in the plugs remain open until after the gaseous medium has passed through the mould and fused the beads in contact with the plugs. The flow of the hot gaseous medium through the mould expands and fuses the beads in the center of the mould before exhausting through the apertures in the plugs, together with air, gas, and moisture displaced from the mould by expansion of the beads. The resultant article has a substantially more even density with better structural properties than could be obtained with the previously practiced method of steam heating. This in turn enables a much denser product to be produced then was previously possible for a given thickness of section.

The gaseous medium may be hot air, but is preferably steam at a pressure of, for example, 14–20 lbs. per square inch, and the interior of the mould may be vented to atmosphere or to a region at sub-atmospheric pressure.

Hitherto, the inlet apertures in moulds for expandable thermoplastic material have been formed by axial bores or slots in metal plugs set in ports in the mould walls. Such plugs are generally formed of aluminium alloy, approximately half an inch in diameter, and spaced apart at two inch centers, the plug being formed with several narrow slots for passage of steam. When a mould fitted with such inlet plugs is vented through plugs of low heat conductivity material in accordance with the present invention, for example by placing the mould in a steam autoclave and connecting the vent plugs to an exhaust manifold system leading outside the autoclave to atmosphere, the flow of steam through the inlet apertures prevents immediate fusion of the beads adjacent these apertures for a time long enough for the steam to heat the beads in the center of the mould. After the inlet apertures are sealed by expansion and fusion of the beads at the walls of the mould, the beads at the center of the mould continue to expand due to the heat of the steam within the mould, and the air, gas, condensate and steam displaced by expansion of the beads are expelled to atmosphere through the vent plugs. The apertures in the vent plugs remain open for a short time after closure of the apertures in the inlet plugs since there is little or nor heat conduction from the walls of the mould to the beads in contact with the vent plugs, in accordance with the teaching of the invention.

It has however also been discovered that appreciable advantages are obtained if the hot gaseous medium is introduced into the mould through apertures in plugs of low heat conductivity material set into the wall of the mould and forming part of the internal surface of the mould. The inlet apertures do not then become blocked due to "burning on" of the thermoplastic material, as occurs with metal inlet plugs, so that there is no time wasted in cleaning the plugs between moulding operations. Also, the low heat conductivity inlet plugs do not leave burn marks or impressions on the finished article, and the article is easier to release from the mould walls than with moulds having metal inlet plugs. This results in a shorter time for the moulding operation.

The inlet plugs, like the vent plugs, are preferably formed of nylon, but may be of any suitable material capable of withstanding the temperature and pressure of the gaseous medium without degradation and having a low enough co-efficient of thermal conductivity to ensure that the inside surfaces of the plugs do not reach a temperature sufficient to burn the thermoplastic material in contact with the plugs prior to fusion of the beads in the center of the mould due to introduction of the hot gaseous medium into the mould.

The venting of the mould in accordance with the invention may take place immediately after introduction of the gaseous medium into the mould, and the same plugs of low heat conductivity may thus be used both for the introduction of the gaseous medium into the mould and for subsequent venting of the mould. This method is particularly applicable to automatic moulding machines in which the steam chests supplying steam to the inlet apertures in the walls of the mould are of relatively small capacity and can be quickly vented.

Figure 6:
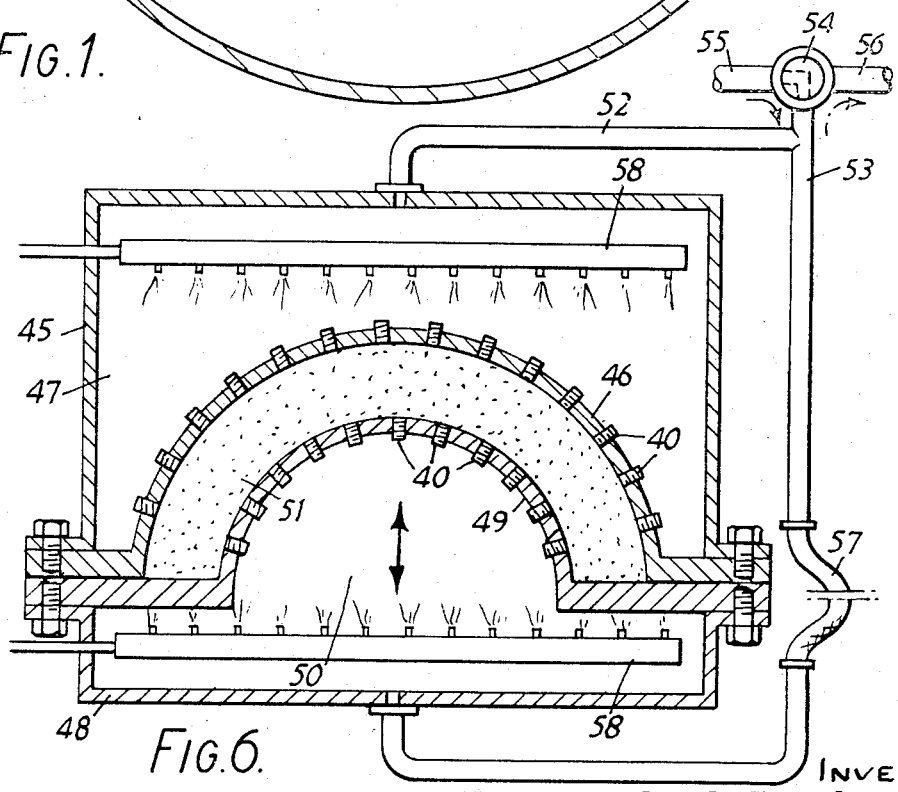

Embodients of the invention will now be described, by way of example, with reference to the accompanying drawings, in which:

FIG. 1. is a sectional view of a mould mounted in a steam autoclave and vented to atmosphere by a manifold system, FIG. 2. is a perspective view of one of the plugs fitted in the wall of the mould of FIG. 1, FIG. 3. is a fragmentary view of part of a wall of the mould fitted with two of the plugs shown in FIG. 2, one plug permitting passage of steam into the mould and the other plug connected to the manifold system, FIG. 4. is a perspective view of another construction of plug adapted to serve either as an inlet or a vent, FIG. 5. is a fragmentary view of part of a wall of a mould fitted with two of the plugs shown in FIG. 4, one plug serving as an inlet plug and the other plug connected to a manifold system to serve as a vent plug, and FIG. 6. is a sectional view of an automatic moulding machine adapted to carry out the method of the invention.

The mould shown in FIG. 1. comprises upper and lower formers 10, 11 have side flanges 12, 13 respectively which are bolted together to define between the formers a space 14 corresponding to the dimensions of an article to be moulded in expandable polystyrene by the method of the invention. The two formers have end walls (not shown) which co-operate to close the ends of the mould. The formers are made of aluminum alloy, and nylon plugs 15 are set in ports 16 in the walls of the formers.

The plugs 15 are all identical in construction and, as shown in FIGS. 2 and 3, each plug comprises a cylindrical tube 20, approximately 1¼ inches in diameter, which is a force fit in its port 16, the outer end of the tube having a collar 21 which engages against the outside wall of the former surrounding the port. The collar 21 is provided with apertures for screws 22 securing the plug to the former. The inner end of the cylindrical tube 20 is closed by an end wall 23 which is flush with the inside wall of the former, this end wall 23 having several parallel slots 24 for passage of fluid through the plug. The plugs are distributed evenly over the walls of the formers and spaced approximately seven inches apart. The plugs are made of nylon of the grade marketed under the trade name "Nylon 66" by Combined Insulations and Plastics Ltd. of London, but any other grade of nylon or any other material which has a comparable low coefficient of thermal conductivity and which can withstand the temperature and pressure of steam used in the moulding operation would be suitable. The inside wall of the tube 20 is provided with a screw thread 25.

An exhaust manifold system 28 is connected to a selected number of the plugs 13, the selected plugs being spaced evenly over the walls of the formers. The manifold system comprises a common manifold tube 29, individual pipes 30 leading from the tube 29 and connected one to each of the selected plugs, and an exhaust pipe 31 leading from the manifold tube 29. The pipes 30 are formed with external screw threads which are screwed into the screw threads 25 on the selected plugs, as shown in FIG. 3. The selection of the plugs to be connected to the manifold system will depend on the shape and thickness of the article to be moulded, but in practice it has been found that satisfactory results are obtained if one in twelve of the plugs are connected to the manifold system. It may however be necessary to connect a larger number of plugs to the manifold system at parts of the mould having abrupt changes in shape or thickness. For convenience, the plugs connected to the manifold system will hereinafter be referred to as the vent plugs 35, and the other plugs will be referred to as the inlet plugs 36.

In operation, the mould is assembled with the two formers bolted together and the space between the formers is then packed with beads of expandable polystyrene which have been pre-expanded to the required density. The mould is then placed in an autoclave 37, as shown in FIG. 1 with the exhaust pipe 31 of the manifold system extending through an opening in the wall of the autoclave and open to atmosphere. The autoclave is then closed and steam at 14–20 pounds per square inch introduced into the autoclave. The steam in the autoclave flows into the mould through the inlet plugs 36 and heats up the beads in the mould, and air, gas, condensate and steam exhausts to atmosphere through the vent plugs 35 and the manifold system. The manifold system may be connected to a region of subatmospheric pressure to increase the rate of flow of steam into the mould.

The steam in the autoclave heats up the walls of the mould which conduct heat to the beads in the peripheral area of the mould. The beads in contact with the plugs however receive very little heat by conduction from the walls of the mould due to the low heat conductivity of the plugs. The slots 24 in the vent plugs 35 thus remain open until the beads adjacent these plugs are fused by heat from steam within the mould. This steam also heats the beads in the interior of the mould which thus expand and fuse at approximately the same time as the beads in contact with the vent plugs. The continual passage of steam through the inlet plugs 36 prevents immediate fusion of the beads adjacent these plugs for a time long enough to complete the process of expansion and fusion. Also, due to the low heat conductivity of the plugs, the temperature of the inlet plugs does not rise to a valve which would cause burning of the polystyrene in contact with the plugs before the moulding operation is completed.

FIGS. 4 and 5 illustrate another construction of plug marked 40 which can be used either for introducing steam into the mould or for venting the interior of the mould. The plug 40 comprises a cylindrical tube 41, approximately ¾ inch in diameter, open at one end and having an end wall 42 extending across the other end, the wall 42 having several parallel slots 43 for passage of fluid through the plug. The external wall of the plug is screw threaded, and the plug is screwed into a screw threaded port in the wall of the mould with the end wall 42 flush with the internal wall of the mould. The plugs 40 can conveniently be spaced three inches apart throughout the wall of the mould, and selected plugs can be connected to the pipes 30 of the manifold system by internally screwed sleeves 44 screwed on the outer ends of the plugs and onto the ends of the pipes 30, as shown in FIG. 5. The plugs 40 are preferably made of a material which, in addition to having the necessary low coefficient of thermal conductivity, is also resilient so that the screw threads on the plug conform to the screw thread on the port in the mould wall to provide a substantially fluid tight seal. Nylon 66, referred to above, is a suitable material.

The automatic moulding machine shown in FIG. 6, comprises a fixed jaw 45 fitted with a mould former 46 which cooperates with the jaw to define a steam chest 47, and a movable jaw 48 fitted with another mould former 49 which cooperates with the jaw 48 to define a steam chest 50. The jaw 48 is movable between a closed position, shown in FIG. 6, in which the formers enclose a space 51 corresponding to the dimensions of an article to be moulded, and an open position in which a moulded article can be withdrawn from between the formers 46, 49. The two steam chests 47, 50 are connected by pipes 52, 53 to a common two-way valve 54 adapted to connect the pipes simultaneously to either a steam supply pipe 55 or to a pipe 56 open to atmosphere. The pipe 53 has a flexible section 57 to permit movement of the jaw 48. Each steam chest is fitted with a water spray device 58 arranged to spray cooling water on the mould formers. Each former 46, 49 is provided with ports each fitted with a nylon plug 40 as shown in FIG. 4, the plugs being arranged with their end walls 42 flush with the wall of the former constituting the inside wall of the mould. All the plugs 40 are open to the associated steam chest.

In operation, the jaws of the machine are closed and the space between the formers is packed with beads of expandable polystyrene which have been preexpanded to the required bulk density. The beads are supplied through openings in the formers, in known manner. Steam is then supplied simultaneously to the steam chests 47, 50 through the common valve 54, and the steam passes into the mould through the plugs 40. After a short period of time to allow the steam to expand the beads in the center of the mould, the steam chests are connected to atmosphere through the valve 54. Due to the expansion of the beads and the presence of steam within the mould, the interior of the mould is at a higher pressure than atmosphere, and air, gas, condensate and steam are forced outwards through the plugs 40 into the steam chest and out to atmosphere through the valve 54. The formers 46, 49 are then cooled by the spray devices 57 before lowering the jaw 48 to remove the moulded article.

The period of time required to heat the beads in the mould is dependent upon the size and shape of the mould and can only be determined by trial and error. Irrespective of the time required however, the low heat conductivity material of the plugs ensure that the beads in contact with the plugs are not fused due to heat conduction from the walls of the mould and the plugs remain open until air, gas and condensate have been vented from the mould.

I claim:

1. A method of moulding articles from heat-expandable beads of a synthetic thermoplastic polymeric resinous material, by confining the beads within a mould the internal surfaces of which define a cavity conforming to the shape of the article, the mould having metal walls provided with inlet apertures for introducing a hot gaseous medium into the mould so as to expand and fuse the beads therein, applying the hot gaseous medium under pressure to the outside surfaces of the mould walls so that the medium flow through the inlet apertures into the mould, and during moulding venting the interior of the mould through apertures in plugs set into the walls of the mould to form part of the internal surface of the mould, whereby the hot gaseous medium passes through the cavity and exhausts through the apertures in said plugs, wherein the plugs are made of a material having a coefficient of thermal conductivity substantially lower than that of the metal wall of the mould to ensure that the beads in contact with the plugs are not fused sufficiently to block the aperture of the plugs due to heat conduction through the plugs to fusion of the beads in the center of the mould by the hot gaseous medium.

2. A method as claimed in claim 1, wherein the hot gaseous medium is supplied to a chamber containing the mould, and the interior of the mould is vented to atmosphere outside the chamber through a manifold system connected to said plugs.

3. A method as claimed in claim 1 wherein said inlet apertures are provided in further plugs set in the metal walls of the mould to form part of the internal surface of the mould, said further plugs being made of a material having a coefficient of thermal conductivity substantially lower than that of the metal walls of the mould to ensure that the beads do not "burn on" to the plugs and block the apertures therein.

4. A method as claimed in claim 1, wherein the hot gaseous medium is introduced into the mould through the apertures in the plugs, and the mould subsequently vented through the apartures in the plugs during the remainder of the moulding operation.

5. A method as claimed in claim 4, wherein the hot gaseous medium is supplied to a chamber communicating with the apertures in the plugs for passage of the gaseous medium from the chamber into the mould, and the chamber is subsequently vented to effect venting of the interior of the mould through the plugs.

6. A method as claimed in claim 1, wherein the hot gaseous medium is steam.

7. A method as claimed in claim 1, wherein synthetic polymeric resinous material is a synthetic polymeric resinous material capable of withstanding the pressure and temperatures in the mould during the moulding operation and having a coefficient of thermal conductivity within the range $2-8 \times 10^{-4}$ cal./sec./sq. cm./1 (° C./cm.).

8. A method as claimed in claim 7, wherein the synthetic polymeric resinous material is nylon.

9. A method of moulding heat-expandable polystyrene heads to form an article having a section thereof three or more inches thick comprising confining the beads within a mould for the article, the mould having metal walls provided with inlet apertures for introducing a hot gaseous medium into the mould so as to expand and fuse the beads therein, applying a hot gaseous medium under pressure to the outside surfaces of the mould walls so that the medium flows through the inlet apertures into the mould, and venting the mould to atmosphere through apertures in plugs set in the wall of the mould, said plugs forming part of the internal surface of the mould and being made of a material having a coefficient of thermal conductivity low enough to ensure that the beads in contact with the plugs are not fused sufficiently to block the apertures in the plugs due to heat conduction through the plugs prior to fusion of the beads in the center of the mould by the hot gaseous medium.

10. The method of moulding an article of foamed synthetic thermoplastic polymeric resinous material which comprises the steps of introducing expandable granules of the material into the cavity of a mould, applying steam under pressure to the external surfaces of the mould walls, said walls having inlet apertures to permit entry of the steam into the cavity, and venting the mould cavity through vent apertures in the walls thereof to cause the steam to circulate through the cavity, into and out of it through said inlet and vent apertures, until the granules have been heated to their softening temperature and expanded and fused together, which method is characterized by:
venting the cavity through plugs set in the walls of the cavity which have a coefficient of thermal conductivity sufficiently lower than that of the mould walls to prevent fusing of the granules in contact with the plugs to a degree sufficient to form crusts which would block said vent apertures and interfere with circulation of steam through all parts of the cavity.

References Cited

UNITED STATES PATENTS

| | | | |
|---|---|---|---|
| 3,235,908 | 2/1966 | Thompson | 425—4 |
| 3,236,927 | 2/1966 | Thompson | 264—51 |
| 1,983,976 | 12/1934 | Garvey | 425—812 UX |
| 3,015,851 | 1/1962 | Wiles | 264—53 |
| 3,086,248 | 4/1963 | Culp | 264—53 |
| 3,377,662 | 4/1968 | Fukushima | 425—401 |
| 3,405,202 | 10/1968 | Kjell-Berger | 264—53 |
| 3,419,648 | 12/1968 | Leach | 264—53 |

FOREIGN PATENTS

| | | | |
|---|---|---|---|
| 1,117,281 | 6/1968 | Great Britain | 425—812 |

OTHER REFERENCES

Dylite Technical Manual, Chap. 3e, "Mold Technique and Mold Design, Nov. 15, 1959, pp. 1–7, 12–15, 18–22, copy in 264/53.

"Plastics Technology," Misitana, Guilio, "Cooling Most Important for Structural Foam Tooling," pp. 43, 44, copy in 264/53.

Goodier, K. "Steam Molding of Expandable Polystyrene," British Plastics, vol. 35 No. 7, July 1962, pp. 349–355, Copy in 264/53.

PHILIP E. ANDERSON, Primary Examiner

U.S. Cl. X.R.

264—53, 102, 234, 337; 425—812, 817

UNITED STATES PATENT OFFICE
CERTIFICATE OF CORRECTION

Patent No. 3,809,735      Dated May 7, 1974

Inventor(s) Robert Frederick Joseph Cotterell

It is certified that error appears in the above-identified patent and that said Letters Patent are hereby corrected as shown below:

Column 1:    Line 23, "condition" should read --conduction--

Line 70, "nave" should read --have--

Column 2:    Line 40, "cal./sec. sq. cm./" should read --cal./sec./sq.cm./--

Line 46, "oC./cm.)" should read --(°C./cm.)--

Line 47, "tne" should read --the--

Column 6:    Line 20, "flow" should read --flows--

Line 29, "aperture" should read --apertures--

Line 30, "plugs to" should read --plugs prior to--

Lines 59-61 (Claim 7, lines 1-3) read "A method as claimed in claim 1, wherein synthetic polymeric resinous material is a synthetic polymeric resinous material capable of withstanding pressure and"

should read:

--A method as claimed in claim 1, wherein the plugs are made of a synthetic polymeric resinous material capable of withstanding the pressure and--

Line 69, (Claim 9, line 2) "heads" should read --beads--

Signed and sealed this 24th day of September 1974.

(SEAL)
Attest:

McCOY M. GIBSON JR.
Attesting Officer

C. MARSHALL DANN
Commissioner of Patents